Patented Aug. 10, 1937

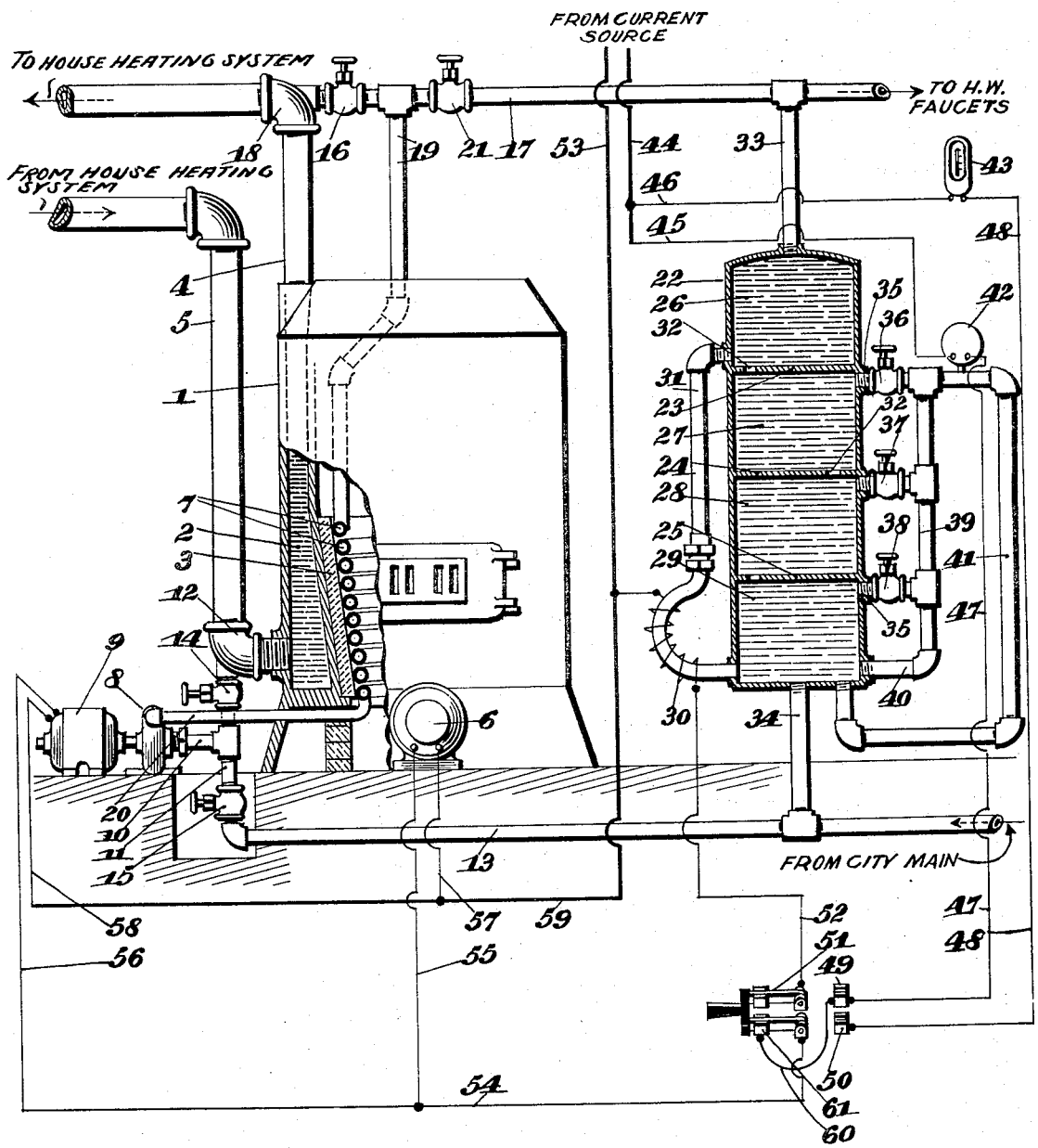

2,089,176

UNITED STATES PATENT OFFICE 2,089,176

WATER HEATING APPARATUS

Edward T. Barron, Minneapolis, Minn.

Application March 14, 1935, Serial No. 11,133

9 Claims. (Cl. 237—19)

This invention relates to improvements in water heating apparatuses, and its objects are as follows:—

First, to provide an inexpensive mode of heating water for domestic and other purposes, according to which any ordinary oil burner can be operated for a short period to quickly heat the water in the hot-water tank, and that without appreciably affecting the temperature of the rooms which are heated by the furnace into which the oil burner is directed.

Second, to accomplish the foregoing purpose by connecting the hot-water tank with a coil in the fire pot of the furnace, there being an arrangement of valves which can be closed so as to confine the forced circulation of a pump to the coil and tank for the rapid heating of the water in the tank without stopping the convective circulation of water in the riser and return pipes of the house heating system.

Third, to use the same arrangement of valves for preventing over-heating of the water in the tank as when the oil burner is normally operated for heating the house, said valves at that time being opened so that the water from the foregoing coil can be sent to the riser as well as to the tank.

Fourth, to not only divide the hot-water tank into compartments as in the patent to E. T. Barron for Hot-water tank, No. 1,581,907 of April 20, 1926, but also to make a water temperature-controlled switch, commonly called an aquastat, subject to control by the temperature of a combination of the compartments so that the aquastat will open and close a connected heating circuit only as the water tank is completely filled with or completely exhausted of hot water.

Fifth, to shield the foregoing aquastat by locating it in a shunt pipe which contains water more directly common to the tank than to the inlet pipe from the city main, this arrangement making it possible for water to flow into the house system from the city main without affecting the aquastat until all of the hot water is discharged from the tank.

Sixth, to provide duplicate modes of heating the water in the hot-water tank, said modes consisting of the foregoing oil burner and of an electrical heater, the electrical heater being supplemental to the oil burner as far as heating the water in the tank is concerned when the oil burner is principally used for heating the house heating system, the aquastat controlling only the oil burner and force pump motors when the oil burner is used for heating water in the tank at which time the electrical heater is out of circuit, and controlling only the electrical heater when connected in circuit, there being a room thermostat for then independently controlling said motors.

Seventh, to control the oil burner by means of the valves for the outlets from the compartments of the hot-water tank when the oil burner is intentionally used for the main purpose of heating the water in said tank, the manner of regulation of said valves, that is to say the manner in which they are adjusted to open and closed positions, determining how soon the associated aquastat shall open the oil burner circuit and, consequently, determine how long the oil burner shall operate for any given period of time.

In the drawing the single view shows the improved apparatus partly in section and in elevation.

In carrying out the invention use is made of an ordinary furnace 1 which is water-jacketed at 2, has a fire pot 3, at least one riser 4 and return pipe 5, as well as an oil burner 6, as illustrated in the co-pending application for patent for Furnace attachment filed by E. T. Barron, June 23, 1934, Serial No. 732,167. A copper or other coil 7 of high conductivity is located in the fire pot 3 as in said application, but instead of the forced circulation set up through it by the pump 8 which is driven by the motor 9, also as in the application, the force-feed and coil are used to quickly heat the water in the hot-water tank without appreciably affecting the room temperature.

This is the beginning of the present invention, and its details involve the following structure: The central intake of the pump 8 includes a pipe 10 which is connected to a pipe 11 in turn respectively connected with the elbow 12 of the return pipe 5 and the feed pipe 13 from the city main (not shown). The pipe 11 has valves 14, 15 connected in it, one on each side of the place of connection of the pipe 10. The valve 14 is one of a pair of valves previously called an arrangement of valves for the purpose of confining the force-feed of the pump 8 to the coil 7 and hot-water tank.

The other valve 16 of the foregoing arrangement is connected into the service pipe 17 which leads from the riser elbow 18 to the hot-water faucets (not shown) of the house. The valve 16 is situated in the pipe 17 between the elbow 18 and the place of connection of a coil riser 19. This riser leads from the upper end of the coil 7. A pipe 20 leads from the discharge side of the pump 8 to the lower end of the coil.

A valve 21 in the service pipe 17, at a point between the place of connection of the riser 19 and the hot-water tank, provides for cutting out the hot-water tank from the house heating system. The riser 4 of the latter can then be supplied with hot water from the coil 7 by force of the pump 8, this, however, being the principle of the co-pending application.

The hot-water tank 22 is identical in its fundamental aspects with the tank in the foregoing Barron patent. The actual number of partitions is immaterial, but for present purposes it is illustrated with partitions 23, 24 and 25 which divide the tank into hot-water compartments 26, 27, 28 and 29. Heating means 30, here shown in the form of an electrical heater, is so associated with a pipe 31 that when it is operated the compartments of the tank 22 will become stored with hot water. For this purpose the extremities of the pipe 31 are connected with the compartments 26 and 29 respectively. The compartments have openings 32 in staggered relationship. The top of the tank is connected with the service pipe 17 by means of a pipe 33. The bottom of the tank is connected with the feed pipe 13 by means of a pipe 34. This ends the similarity of the tank 22 with the tank in the patent.

Each of the compartments 27, 28, and 29 has a valve-controlled outlet 35, the respective valves being designated 36, 37, and 38. It is desired to state that these valves may be remotely controlled, for example by means of chains which will be coupled with the various valves and trained over rollers to the bath room, kitchen and other points. The manner of applying the chain is, however, so obvious, that specific illustration is regarded as unnecessary. These valves are connected by a common pipe 39. At its lower end this pipe is connected near the bottom of the compartment 29 by a pipe 40. At its upper end the pipe 39 is connected with what has been called a shunt pipe 41. The term is used collectively for a system of by-pass piping, the top of the system being in communication with the upper part of the compartment 27, the bottom of the system with a low point of the compartment 29, all as clearly shown in the drawing.

A water temperature-controlled switch or aquastat 42 is either connected directly into the top of the shunt pipe 41, or as is more commonly done with the known aquastat is simply secured to the outside of the pipe. The aquastat and a room thermostat 43 (as well as the heating coil 30) are parts of an electrical system which is described as follows:—

A main wire 44 from a source of current has branches 45, 46 respectively leading to one side of the aquastat 42 and thermostat 43. The other side of each of these devices is connected by means of wires 47, 48 with the terminals 49, 50 of a double-throw switch 51. One of the switch pivots is connected by means of a wire 52 with one side of the coil 30, the other side of the coil being connected with another main wire 53 leading from the source of current.

The other switch pivot has wire connections 54, 55 and 56 with one side of the respective oil burner motor 6 and pump motor 9, the other sides of these motors being connected at 57, 58 and 59 with the main wire 53. The switch terminal 49 is joined by a cross connection 60 with another terminal 61 of the switch 51.

The operation is readily understood:—Inasmuch as the foremost purpose of the invention is to quickly heat the water in the tank 22 by means of the oil burner 6 which affords the cheaper of two modes provided, the switch 51 is first thrown to the left. It can be seen, without tracing the circuits in detail, that the aquastat 42, oil burner motor 6 and pump motor 9 are connected in circuit. The aquastat 42 is usually given a high setting, say 200° F., so that the circuit through it will not be opened until this temperature is reached and exceeded. It is also necessary to close the valve arrangement 14, 16, seeing to it that the valves 15, 21 are open.

This setting of the valves prevents appreciably affecting the room temperature. But some hot water will be delivered to the radiators by way of the riser 4 because the convective action from the water jacket 2 is not stopped by the closing of the valves 14, 16. Thus it is possible to keep the radiators warm, although most of the heat is transferred to the water in the coil 7 because of the high conductivity of the material of the coil. The water in the tank 22 is thus heated quickly, and it is not necessary to run the burner 6 very long to accomplish that purpose.

The period of operation of the oil burner 6 depends on how much hot water is desired, and the requirement of hot water is regulated by the valves 36, 37, and 38. When the valves 36, 37, and 38 are open the top compartment 26 only will be heated before the hot water reaches the aquastat structure 42 and causes it to open the circuit.

When valve 36 is closed and valves 37, 38 are opened, the two top compartments 26, 27 will become heated before the hot water will reach the aquastat 42 and cause it to open the circuit. When valves 36 and 37 are closed and valve 38 is open the three compartments 26, 27 and 28 will become heated before the hot water reaches the aquastat 42 to cause circuit-opening, and when all three valves are closed the entire tank will become heated before the hot water will reach the aquastat 42 and again cause opening of the circuit.

From what has been stated it must be clear, first that the oil burner 6 will operate only as long as required by the setting of the valves 36, 37 and 38. If all valves are open or, conceivably, only the top valve 36, the oil burner 6 will be required to operate but a short time before the water in the compartment 26 becomes hot enough to cause the aquastat 42 to open the circuits of the two motors. Or if all of the valves be closed the oil burner will have to operate correspondingly longer before the aquastat 42 opens the circuits of the two motors. Second, the shunt pipe 41 shields the aquastat 42 from the cold water in the feed pipe 13.

Assume the tank 22 to be full of hot water from top to bottom. An opening of a faucet in the service pipe 17 will cause water at city main pressure to flow into the bottom of the tank by way of the pipe 34. The cold water will drive the hot water upwardly, and because of the fact that the shunt pipe 41 is located to one side of the water current through the tank, and further because of the fact that the water in the shunt pipe is at city main pressure there is a reluctance of the water in the shunt pipe to mingle with the water in the tank. As a consequence all of the hot water can be discharged, and it is not until approximately all of the hot water has been discharged that there is a sufficient temperature drop of the water in the shunt pipe to cause the aquastat 42 to again close the burner and pump motor circuits.

During the winter when the oil burner 6 is necessarily operated more frequently it is intended to open the valve arrangement 14, 16. The force-feed through the coil 7 not only speeds up the heating and distribution of the water in the house heating system, but because of the division of the flow both to the left and right where the coil riser 19 joins the service pipe 17 too much hot water is prevented from accumulating in the tank 22. The temperature of the water in the tank 22 will not exceed the temperature of the water in the heating system, usually from 140 to 170°, and if there should be a demand for hotter water for domestic uses it is only necessary to close the valve arrangement 14, 16 for a brief time when the result will be accomplished, and that without interfering with the heating function of the water jacket 2 and the radiators (not shown) connected in circuit with the riser 4 and return 5.

While the foregoing opening of the valves 14, 16 prevents over-heating of the water in the tank, sight is not lost of the possibility of there not being enough hot water in the entire system to keep the rooms warm during very cold weather and at the same time meet the demand of some households for hot water for domestic purposes even if the burner 6 is forced to operate virtually all of the time. Under such a condition the double throw switch 51 is thrown to the right. This connects the electrical heater 30 in circuit so that the water in the tank 22 is heated from this source independently of the coil 7 in the furnace.

The aquastat 42 now changes its function to controlling the electrical heater 30 whereas before it controlled the oil burner and force pump motors. The latter are now controlled by the room thermostat 43 which is connected in circuit therewith by the foregoing throwing of the switch. The room temperature will control these motors, causing the oil burner to go off and on as may be needed, but the electrical heater 30 will continue its operation independently inasmuch as it is separately controlled by the aquastat 42.

In conclusion it is desired to state that an electrically controlled gas heater can be used in substitution of the heating coil 30. The purpose here would be of economizing in the use of fuel, it being cheaper generally, to burn gas than to consume electricity. The aquastat 42 would exercise the same control over the gas heater as it does over the coil 30.

I claim:—

1. In a water heating apparatus consisting of a furnace having a water-jacket to which a house heating system is connected, said system including a return pipe coupled with the jacket, said furnace having a firepot with a water coil therein and a burner; the combination of a hot-water tank and pipe connections joining its upper end to the top of the coil and its lower end to the return pipe, a motor-driven force pump having an intake pipe joined with one of the pipe connections and having a discharge pipe joined with the lower end of the coil, and a valve arrangement in said pipe connections for confining the force-feed of the pump to the coil and hot-water tank to the exclusion of the house heating system.

2. Water heating apparatus consisting of a furnace having a water-jacket to which the riser and return pipes of a house heating system are connected and having a firepot with a water coil therein, and a burner; a hot-water tank, a service pipe connecting the upper end of the tank to the riser, the service pipe having joined to it a coil riser which goes to the upper end of the coil, a feed pipe connecting the lower end of the tank to the return pipe, a motor-driven force pump which has an intake joined with the feed pipe and a discharge pipe joined to the lower end of the coil, a pair of valves coupled in the service pipe on opposite sides of the coil riser, and a single valve coupled in the feed pipe between the intake and return pipes, opening of all of said valves enabling common distribution of hot water under force-feed from the jacket and coil to the heating system and tank, closing of that one of the pair of valves on the tank side of the coil riser combining the convective and force-feed of hot water respectively from the jacket and coil to the house heating system, the opening of said valve and the closure of the remaining valves confining the force-feed of hot water from the coil to the tank.

3. Water heating apparatus consisting of a furnace having a water-jacket to which the riser and return pipes of a house heating system are connected and having a firepot with a water coil therein, and a burner; a hot-water tank, a service pipe joining the top of the tank with the riser there being a coil riser going from the service pipe to the upper end of the coil, a feed pipe joining the bottom of the tank with the return pipe, a force-feed pump coupled in between the feed pipe and bottom of the coil, the supply of hot water under force-feed dividing in the service pipe and going to the tank and riser in which it augments the convective supply of the water-jacket, and individually operative water heating means for the tank to heat the water in the tank independently of the burner so as to insure an adequate supply in the tank in case the demand on the heating system is excessive.

4. Water heating apparatus consisting of a furnace having a water-jacket to which a house heating system is connected and having a firepot with a water coil therein, and a motor-driven burner to heat the interior of the firepot; a hot-water tank and pipe connections joining it to the ends of the coil, an electrical heater supplemental to the burner for heating the water in the tank, a water temperature-controlled switch functioning first to control the burner motor, second to control the electrical heater, and electrical circuits embracing said switch together with the burner motor electrical heater when the hot water tank is filled with cold water, there being a manual switch to which said circuits are joined so that when the switch is thrown into the respective ones of two positions the temperature-controlled switch is caused to perform its respective functions, the water temperature-controlled switch functioning to open the circuits to the burner motor or the electric heater when the temperature of the water reaches a predetermined degree.

5. Water heating apparatus consisting of a furnace having a water-jacket to which a house heating system is connected and having a firepot with a water coil therein, and a motor-driven burner to heat the interior of the firepot; a hot-water tank and pipe connections joining it to the ends of the coil, and electrical heater supplemental to the burner for heating the water in the tank, a water temperature-controlled switch functioning first to control the burner motor, second to control the electrical heater, electrical circuits embracing said switch together with the burner motor electrical heater when the hot water tank is filled with cold water, there being a manual switch to which said circuits are joined so that when the switch is thrown into the respective ones of two positions the temperature-controlled switch is caused to perform its respective functions, and a room-temperature thermostat which is thrown into circuit to independently control the burner motor when the manual switch is positioned to cut the temperature switch out of controlling said motor, the water temperature-controlled switch functioning to open the circuits to the burner motor or the electric heater when the temperature of the water reaches a predetermined degree.

6. Water heating apparatus consisting of a furnace having a water-jacket to which a house heating system is connected and having a firepot with a water coil therein, and a motor-driven burner to heat the interior of the firepot; a hot-water tank and pipe connections joined to the ends of the coil and tank, piping branching out from the sides of the tank and communicating with the approximate bottom thereof so as to by-pass the water, a water temperature-controlled switch associated with said piping, said switch being connected in a circuit which embraces the burner motor, and at least one valve in said piping which can be opened to make the switch subject to the tank water temperature and so place the burner motor under control of said switch, the closing of the valve suspending the controlling function of the switch.

7. Water heating apparatus consisting of a furnace having a water-jacket to which a house heating system is connected and having a firepot with a water coil therein, and a motor-driven burner to heat the interior of the firepot; a hot-water tank and pipe connections joined to the ends of the coil and tank, said tank having partitions dividing it into superposed plural communicating compartments, piping branching out from the sides of the tank placing the various compartments in communication with each other and with the approximate bottom of the tank so as to by-pass the water, a water temperature-controlled switch associated with the piping, said switch being connected in a circuit which embraces the burner motor, and valves in the compartment connections of the piping being adjustable to a combination of open and closed positions in order to control how soon the water temperature shall affect said switch, said valves consequently determining how long the burner motor shall operate for a given period of time.

8. Water heating apparatus consisting of a furnace having a water-jacket to which a house heating system is connected and having a firepot with a water coil therein, and a motor-driven burner to heat the interior of the firepot; and a hot-water tank and pipe connections joining it both to the heating system and to the ends of the coil, said pipe connections including an inlet pipe from a city main and a service pipe to house faucets, a water temperature-controlled switch associated with the tank and being connected in a circuit which embraces the burner motor, and a shunt pipe placing the side of the tank in communication with its approximate bottom to contain water more directly common to the tank than to said inlet pipe thereby to shield said switch, said switch being attached to that part of the shunt pipe which contains water at a higher temperature than the lower portions of the tank so as not to close the motor circuit until the hot water which is at a level with the attached switch is discharged from the tank and service pipe by the opening of a faucet.

9. Water heating apparatus consisting of a hot-water tank which has partitions dividing it into a plurality of superposed communicating compartments, piping connecting the virtual extremities of the tank and having heating means associated therewith so as to heat the water in the tank, a water temperature-controlled switch and an electrical circuit connecting both the switch and the heating means so that the heating means is subject to the switch, by-pass piping which places the compartments in communication with each other through said piping, the switch being associated with that part of said piping which will contain water at a higher temperature than the lower portions of the tank, and valves in said piping which may be so regulated that one or more of the compartments are filled with hot water from the top down before the hot water reaches that part of the piping where the switch is located to cause said switch to open the circuit.

EDWARD T. BARRON.